US010691296B2

(12) United States Patent
Lee et al.

(10) Patent No.: US 10,691,296 B2
(45) Date of Patent: Jun. 23, 2020

(54) ELECTRONIC DEVICE FOR COLLECTIVE CONTROL OF NOTIFICATIONS OF APPLICATIONS IN FOLDERS

(71) Applicant: Samsung Electronics Co., Ltd., Gyeonggi-do (KR)

(72) Inventors: Yong Gu Lee, Gyeonggi-do (KR); Kyu Ok Choi, Gyeonggi-do (KR); Ji Won Kim, Gyeonggi-do (KR); Young Hak Oh, Gyeonggi-do (KR); Sun Young Yi, Gyeonggi-do (KR); Won Jun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/188,763

(22) Filed: Nov. 13, 2018

(65) Prior Publication Data

US 2019/0146655 A1    May 16, 2019

(30) Foreign Application Priority Data

Nov. 14, 2017    (KR) .................. 10-2017-0151792

(51) Int. Cl.
*G06F 3/0481* (2013.01)
*G06F 3/01* (2006.01)
*G06F 3/14* (2006.01)
*G06F 3/0482* (2013.01)

(52) U.S. Cl.
CPC .......... *G06F 3/04817* (2013.01); *G06F 3/016* (2013.01); *G06F 3/0482* (2013.01); *G06F 3/1423* (2013.01)

(58) Field of Classification Search
CPC .... G06F 3/04817; G06F 3/016; G06F 3/0482; G06F 3/1423
See application file for complete search history.

(56) References Cited

U.S. PATENT DOCUMENTS

| 9,635,638 B1* | 4/2017 | Burlingham .......... H04M 19/04 |
| 2005/0075885 A1* | 4/2005 | Danieli .................. A63F 13/12 |
| | | 704/276 |
| 2007/0025335 A1* | 2/2007 | Patel ...................... G06F 9/451 |
| | | 370/352 |
| 2007/0087790 A1* | 4/2007 | Worick ............... H04M 19/041 |
| | | 455/567 |
| 2013/0241918 A1 | 9/2013 | Satyan |
| 2014/0359465 A1 | 12/2014 | Litan Sever et al. |
| 2017/0083208 A1 | 3/2017 | Hyun et al. |
| 2017/0168667 A1 | 6/2017 | Jeon et al. |

FOREIGN PATENT DOCUMENTS

| KR | 10-2008-0037382 A | 4/2008 |
| KR | 10-2009-0111670 A | 10/2009 |
| KR | 10-2015-0094057 A | 8/2015 |

OTHER PUBLICATIONS

International Search Report dated Feb. 27, 2019.

* cited by examiner

*Primary Examiner* — Mandrita Brahmachari
(74) *Attorney, Agent, or Firm* — Cha & Reiter, LLC.

(57) ABSTRACT

An electronic device includes a display, a memory, and a processor, and the processor displays, on the display, a folder icon that includes execution icons of a plurality of applications and, in response to a first user input selecting the folder icon, displays a user interface for collectively controlling notifications for the plurality of applications.

19 Claims, 12 Drawing Sheets

ELECTRONIC DEVICE FOR COLLECTIVE CONTROL OF NOTIFICATIONS OF APPLICATIONS IN FOLDERS

CROSS-REFERENCE TO RELATED APPLICATION(S)

This application is based on and claims priority under 35 U.S.C. § 119 to Korean Patent Application No. 10-2017-0151792, filed on Nov. 14, 2017, in the Korean Intellectual Property Office, the disclosure of which is incorporated by reference herein its entirety.

BACKGROUND

1. Field

The present disclosure generally relates to an electronic device that is capable of operating applications.

2. Description of Related Art

Electronic devices, such as smartphones, tablet PCs, or the like, may execute various types of applications installed therein to provide various functions such as enabling telephone calls, video playback, Internet search, and the like. These electronic devices may display, on their screens, execution icons for executing these applications. When a user selects one of the execution icons, the application corresponding to the selected execution icon may be executed. To organize these execution icons, the electronic devices may provide a function for managing the execution icons in folders. Employing this function, the user may include various execution icons in one folder.

The above information is presented as background information only to assist with an understanding of the present disclosure. No determination has been made, and no assertion is made, as to whether any of the above might be applicable as prior art with regard to the present disclosure.

SUMMARY

Conventional electronic devices may manipulate folders with simple functions, such as modifying the color of a folder icon, changing the order in which icons are arranged, and the like. These electronic devices do not collectively control notifications of the applications in a folder. As such, a disadvantage exists in the art where notifications of applications in folders are not well managed.

Aspects of the present disclosure are to address at least the above-mentioned problems and/or disadvantages and to provide at least the advantages described below.

In accordance with an aspect of the present disclosure, an electronic device includes a display, a memory, and a processor, and the processor displays, on the display, a folder icon that includes execution icons of a plurality of applications and, in response to a first user input selecting the folder icon, displays a user interface for collectively controlling notifications for the plurality of applications.

The electronic device according to one or more embodiments of the present disclosure can collectively control notifications of applications in a folder.

The electronic device according to one or more embodiments of the present disclosure can provide various types of notification patterns for applications in a folder.

The electronic device according to one or more embodiments of the present disclosure can provide different notification patterns for applications included in a folder. These notification patterns may be varied depending on time, place, importance, etc.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
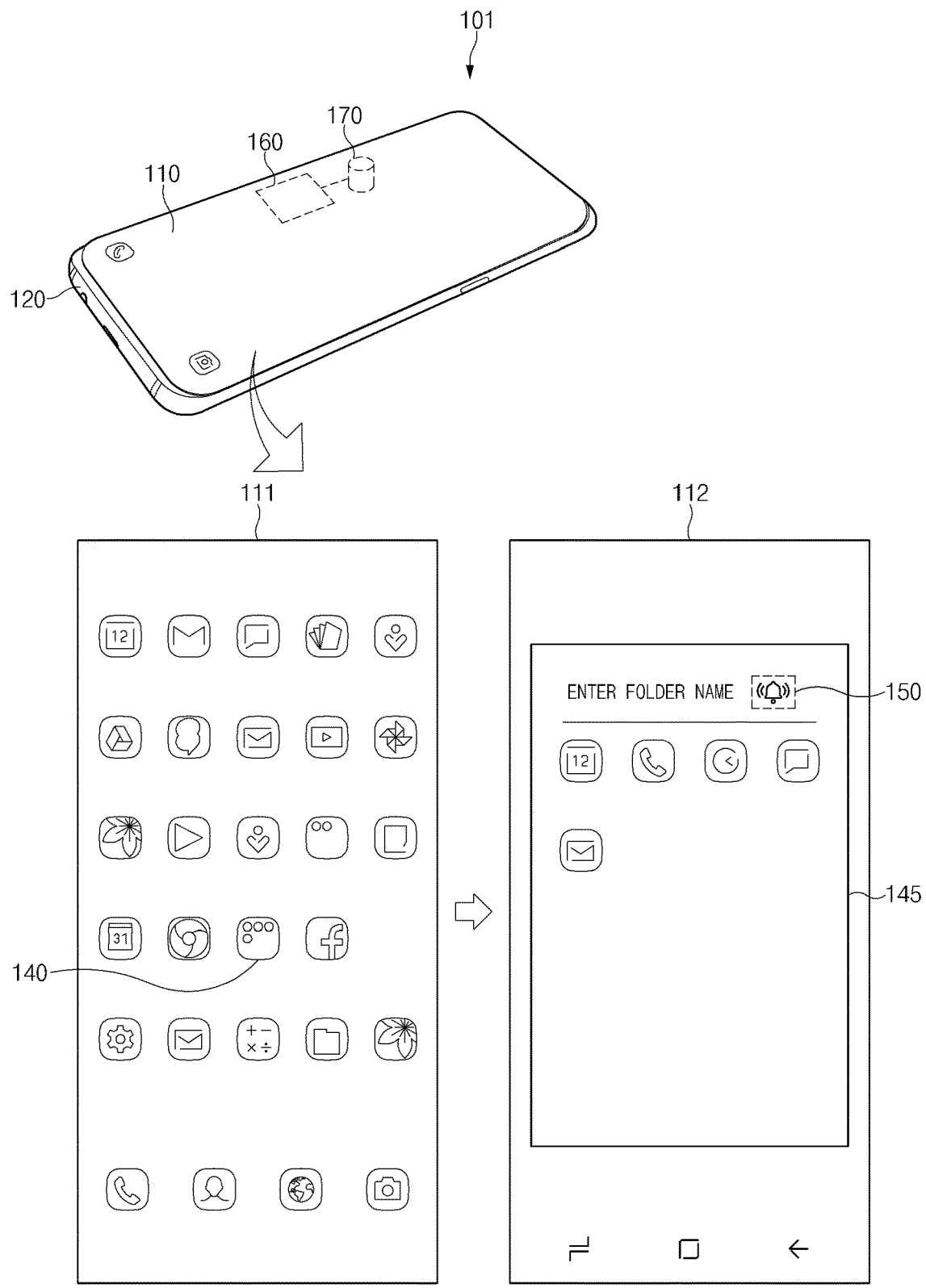
FIG. 1 illustrates an electronic device according to an embodiment.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and the present disclosure. With regard to description of drawings, similar components may be marked by similar reference numerals.

In the disclosure disclosed herein, the expressions "have," "may have," "include," "comprise," "may include," and "may comprise" used herein indicate existence of corresponding features (for example, elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for," "having the capacity to," "designed to," "adapted to," "made to," or "capable of." The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal meaning unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the present disclosure will be described with reference to the accompanying drawings. The term "user" used herein may refer to a person who uses an electronic device or may refer to a device (for example, an artificial intelligence electronic device) that uses an electronic device.

FIG. 1 illustrates an electronic device 101 according to an embodiment.

Referring to FIG. 1, the electronic device 101 may include a display 110, a housing (or a main body) 120, a processor 160, and a memory 170.

The display 110 may output contents such as text, images, and the like. The display 110 may output execution screens of various applications that operate on the electronic device 101. In an embodiment, the display 110 may detect a touch input by a part of a user's body. For example, the display 110 may display a home screen 111 which includes execution icons of applications. In response to the user's touch input to one of the execution icons, the display 110 may display the application execution screen corresponding to the touched execution icon.

According to an embodiment, the display 110 may display a folder icon 140. The folder icon 140 may be associated with a plurality of applications. When the user selects the folder icon 140, the display 110 may display a user interface for setting attributes of various execution icons included in the folder (or a group) corresponding to the plurality of applications.

The housing (or the main body) 120 may fix the display 110 and may protect various components of the electronic device 101 inside. The housing 120 may include a button, a sensor window, a speaker, a camera module, and the like on the exterior thereof.

The housing (or the main body) 120 may include various components inside, such as a communication circuit, the processor 160, the memory 170, a printed circuit board, a battery, and the like that are required to operate the electronic device 101.

The processor 160 may perform various data processing and computations to operate the electronic device 101. The processor 160 may execute various applications installed in the electronic device 101 and may perform the relevant computations. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 160 may group and manage a plurality of applications installed in the electronic device 101. For example, the processor 160 may collectively control notifications for a plurality of applications included in one folder, for example a folder that corresponds to the folder icon 140. In another example, the processor 160 may collectively control notifications for a plurality of applications whose execution icons are included in the home screen 111. In the following description, the described examples may relate to a plurality of applications that are grouped and managed in one folder. However, the present disclosure is not limited thereto.

According to an embodiment, the processor 160 may output notifications for a plurality of applications included in one folder by using the same type of notification (e.g., the same notification tone or the same haptic pattern (or vibration pattern)).

For example, the processor 160 may display the folder icon 140 on the home screen 111. In response to a specified user input (e.g., a short touch) to the folder icon 140, the processor 160 may display a user interface 145 that shows a list of the icons corresponding to the plurality of applications included in the folder. The user interface 145 may include an object (hereinafter, referred to as the notification setting object) 150 for collectively controlling notifications for the plurality of applications included in the folder.

In response to a user input to the notification setting object 150, the processor 160 may collectively change the notifications for the plurality of applications included in the folder. Additional information about the methods of controlling the notifications for the plurality of applications may be provided through FIGS. 2 to 10.

The memory 170 may store information required to operate the electronic device 101. For example, the memory 170 may store information relating to execution of the applications installed in the electronic device 101.

Figure 2:
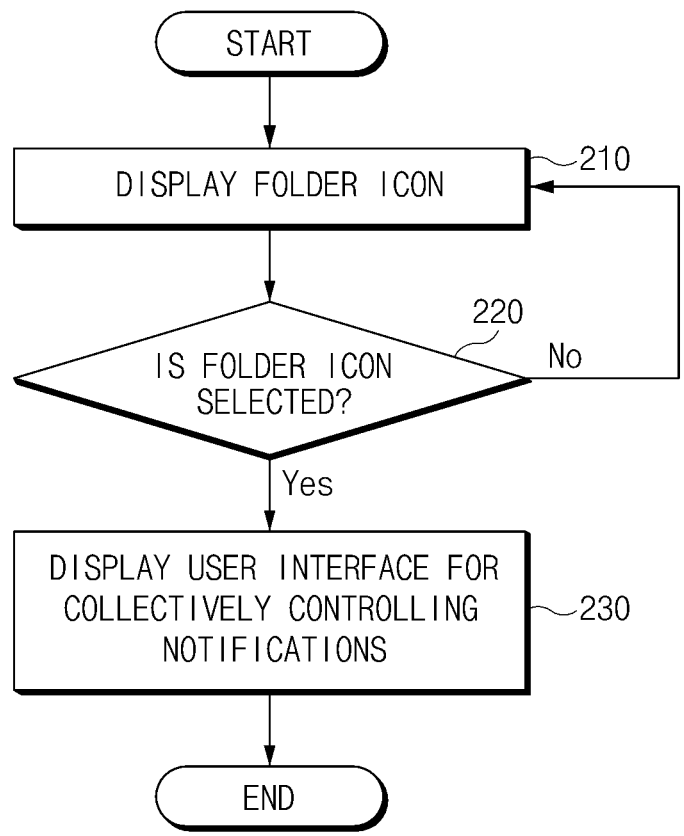
FIG. 2 is a flowchart illustrating a method of setting notifications for applications, according to an embodiment.

FIG. 2 is a flowchart illustrating a method of setting notifications for applications, according to an embodiment.

Referring to FIG. 2, in operation 210, the processor 160 may display a folder icon that includes miniaturized versions of execution icons of a plurality of applications on the display 110. When the folder is created, the processor 160 may store, in the memory 170, a list of the plurality of applications included in the folder.

According to an embodiment, the plurality of applications may be a subset of applications installed in the electronic device 101. The execution icons of the plurality of applications may be displayed on the display 110. An application corresponding to an execution icon may be executed in response to a user input to the particular execution icon. For example, the plurality of applications may include a camera application, a memo application, a telephone application, a message application, and the like.

According to an embodiment, the folder icon may be created by a user input. For example, the folder may be created when an execution icon of a first application is moved by a user input to overlap an execution icon of a second application, such that the corresponding folder icon includes the execution icon of the first application and the execution icon of the second application. In an embodiment, the folder icon may be an image in which the images of the execution icons of the plurality of applications overlap each other.

In operation 220, the processor 160 may determine whether a user input for selecting the folder icon is made. In an embodiment, the user input may be a short touch input (a touch input to the folder icon and then the release of the touch within a specified period of time). In another embodiment, the user input may be a long touch input (a touch input to the folder icon, where the touch is maintained for a specified period of time or more).

In operation 230, in response to the user input for selecting the folder icon, the processor 160 may display a user interface for collectively controlling notifications for the plurality of applications included in the folder.

According to an embodiment, the user interface may include at least one notification setting object, which may be embodied as a touch button, for notification settings. In response to an additional user input to the notification setting object, the processor 160 may collectively control the notifications for the plurality of applications included in the folder.

According to another embodiment, the user interface may further include a haptic pattern list for notification settings. For example, in response to a specified input (e.g., a long touch input, a 3D touch input, a double tap input, a slide input, or the like) to the folder icon, the processor 160 may display a list in a pop-up window that includes various haptic patterns that can be set for the folder.

According to this embodiment, when a haptic pattern is set through the user interface, the processor 160 may output the notifications for the plurality of applications included in the folder by using haptic feedback having the selected haptic pattern.

Figure 3:
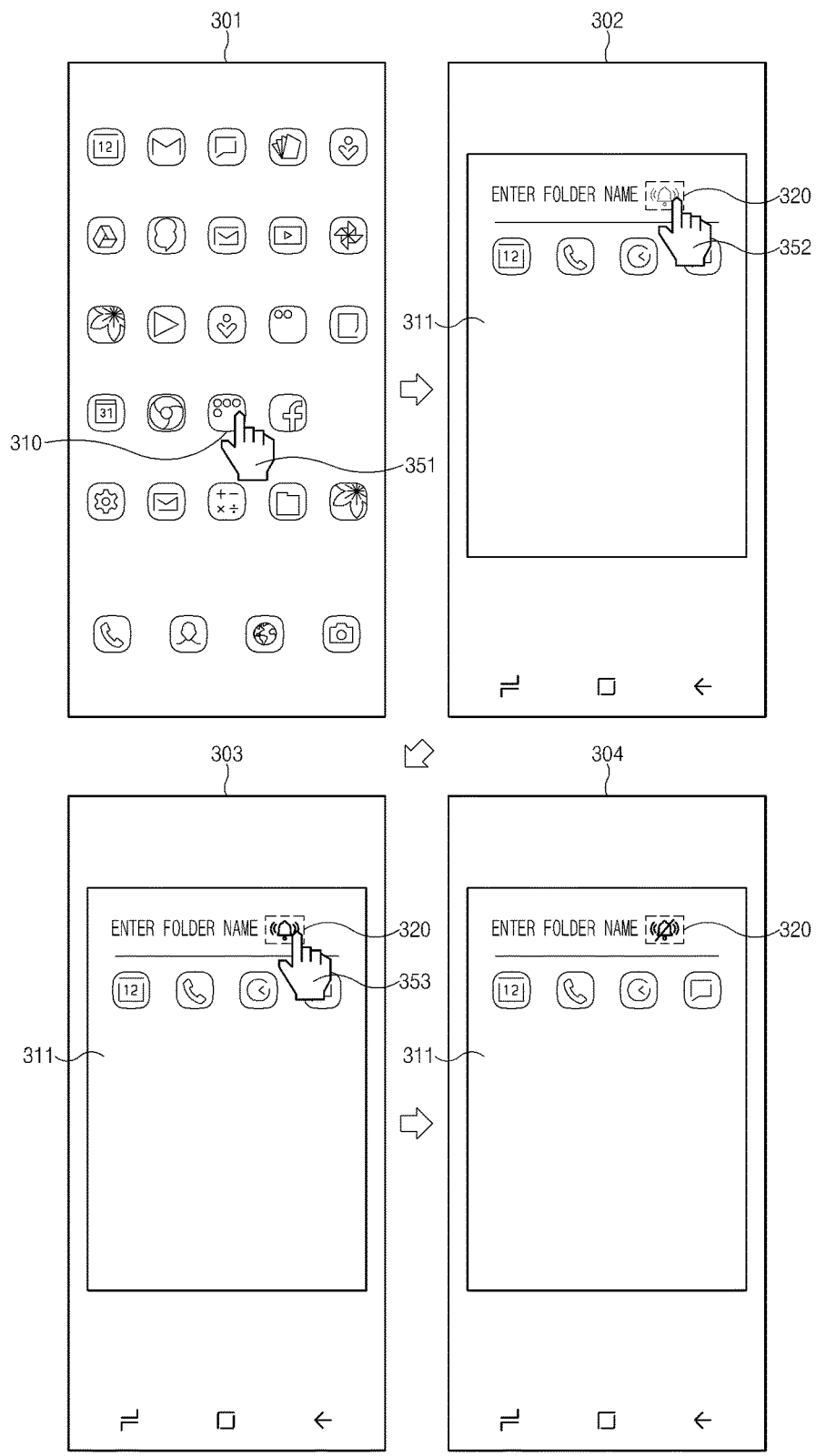
FIG. 3 illustrates screens relating to notification type settings according to an embodiment.

FIG. 3 illustrates screens relating to notification type settings according to an embodiment. FIG. 3 is merely illustrative, and the present disclosure is not limited thereto.

Referring to FIG. 3, the processor 160 may display a folder icon 310 on a screen 301 of the display 110. For example, the processor 160 may arrange the folder icon 310 and execution icons of various applications at specified intervals on the home screen.

According to an embodiment, the folder icon 310 may be created in response to a user input (e.g., an input to overlap execution icons) or a request of another application. Alternatively, the folder icon 310 may be created by the electronic device's manufacturer before the electronic device is sold.

In response to a first user input 351 (e.g., a short touch input) for selecting the folder icon 310 on the screen 301, the processor 160 may display, on the screen 302, a first user interface 311 that displays execution icons of the plurality of applications included in the folder.

The first user interface 311 may include, on the screen 302, a notification setting object 320 (e.g., a touch button) for collectively controlling notifications for the plurality of applications included in the folder. While FIG. 3 illustrates an example where the notification setting object 320 is a single touch button embodied as an icon, the notification setting object 320 is not limited thereto. For example, the notification setting object 320 may include a plurality of touch buttons. Other embodiments of the notification setting object are disclosed below, such as an alternative embodiment shown in FIG. 5.

According to an embodiment, when there is no additional user input to the notification setting object 320, the processor 160 may output the notifications for the plurality of applications by using the various notification types set for the respective applications. For example, notification for a first application may be output by using a first haptic pattern, and notification for a second application may be output by using a second haptic pattern.

In response to a second user input 352 to the notification setting object 320 on the screen 302, the processor 160 may set the notifications for all applications in the plurality of applications included in the folder to a preset notification type (e.g., vibration notification with a specified pattern).

According to an embodiment, the processor 160 may modify the image of the notification setting object 320 to allow a user to recognize the change in the notification types of the plurality of applications. For example, the processor 160 may modify the color of the notification setting object 320 (e.g., from white to orange).

According to an embodiment, the processor 160 may provide a haptic pattern list applicable to the plurality of applications included in the folder. For example, the processor 160 may output a list including various types of haptic patterns in response to a specified input (e.g., a long touch input, a 3D touch input, a double tap input, a slide input, or the like) to the notification setting object 320. Additional information about the haptic pattern list is provided through FIGS. 4A and 4B.

In response to a third user input 353 to the notification setting object 320 on a screen 303, the processor 160 may collectively block the notifications for the plurality of applications included in the folder, as shown on a screen 304. The processor 160 may modify the image of the notification setting object 320 to allow the user to recognize that the notifications for the plurality of applications are blocked. When the user does not want to be notified by the plurality of applications included in the folder (e.g., when the user is in class or in a meeting), the user may control the notification setting object 320 to collectively block the notifications.

Figure 4A:
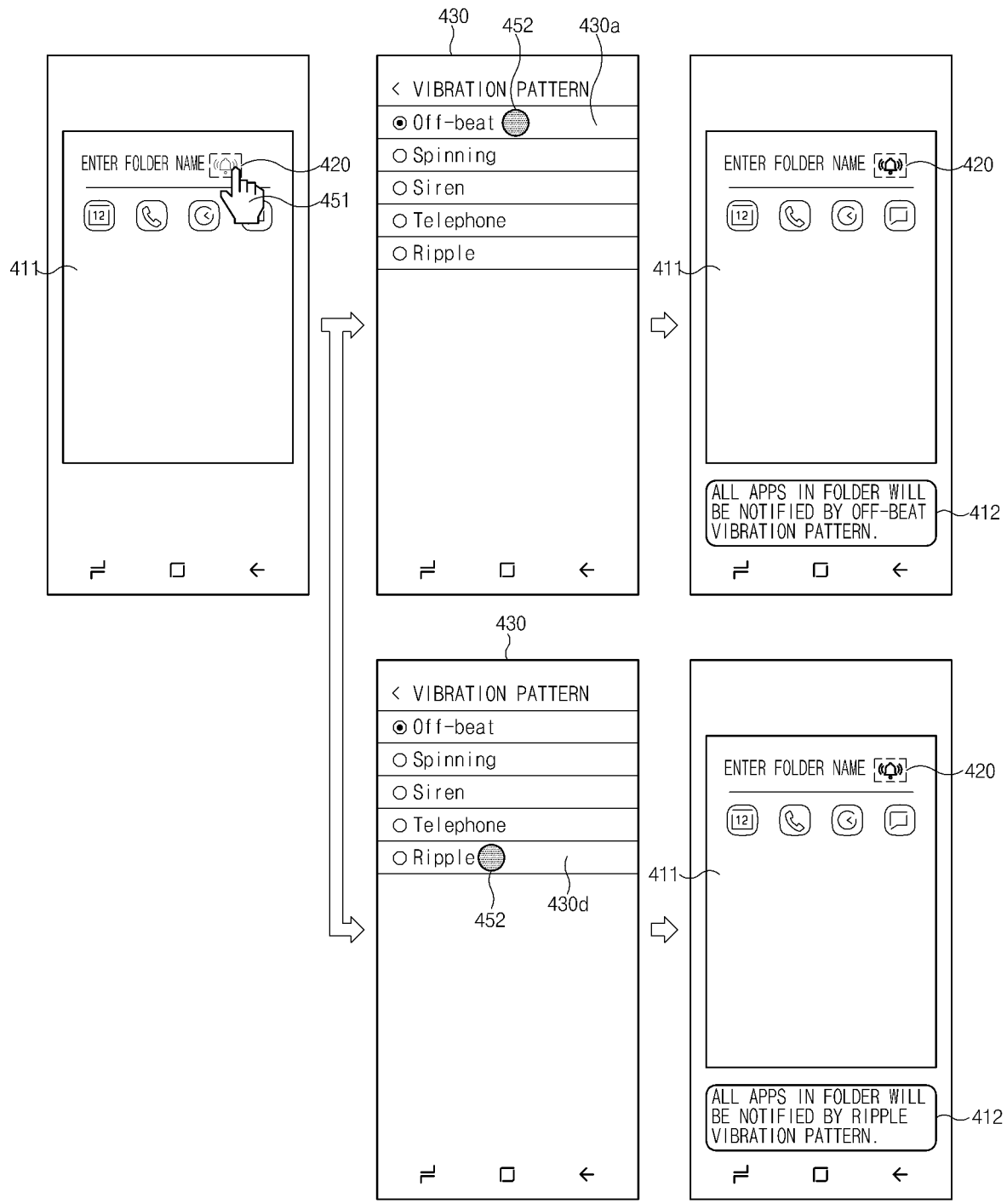
FIG. 4A illustrates screens on which a haptic pattern list is displayed, according to an embodiment.

FIG. 4A illustrates screens on which a haptic pattern list is displayed, according to an embodiment. While FIG. 4A illustrates an example that the haptic pattern list is displayed, the present disclosure is not limited thereto. For example, a list of various types of notification, such as notification sounds or notification LED colors, may be displayed. Here, "LED" may stand for "light emitting diode."

Referring to FIG. 4A, when a folder icon is selected, the processor 160 may display a first user interface 411 that displays the execution icons of the plurality of applications included in the folder.

Using the first user interface 411, a user may modify the name of the folder, add an application to the folder, or remove an application included in the folder. For example, when the user presses an application add button (not show), a list of applications that can be added to the folder may be displayed.

The first user interface 411 may include a notification setting object 420 for collectively setting notifications.

In response to a specified user input 451 (e.g., a long touch input, a 3D touch input, a double tap input, a slide input, or the like) to the notification setting object 420, the processor 160 may display a haptic pattern list 430.

The haptic pattern list 430 may display various types of haptic patterns applicable to the folder. For example, the haptic pattern list 430 may include off-beat pattern, spinning pattern, siren pattern, telephone pattern, and ripple pattern.

When the user selects one haptic pattern from the haptic pattern list 430, notifications for the applications included in the folder may be output using the selected haptic pattern.

For example, when the user selects the off-beat haptic pattern 430a from the haptic pattern list 430 via touch input 452, the processor 160 may set the notifications for the applications included in the folder to the off-beat pattern. When at least one of the applications included in the folder generates notification, the processor 160 may output a notification according to the off-beat pattern.

In another example, when the user selects a ripple pattern 430d from the haptic pattern list 430 via touch input 452, the processor 160 may set the notifications for the applications included in the folder to the ripple pattern. When at least one of the applications included in the folder generates notification, the processor 160 may output vibration a notification according to the ripple pattern.

According to an embodiment, when the haptic pattern applied to the folder is changed in response to a user input, the processor 160 may inform the user of the change through a pop-up 412.

According to an embodiment, through a separate second user interface (not illustrated), the processor 160 may set the output condition of the haptic pattern applied to the folder. For example, the processor 160 may display the second user interface including a field for setting particular times (e.g., 09:00-18:00) or places (e.g., the user's work) where the haptic pattern applied to the folder can be output.

When such output condition is set, the processor 160 may output the haptic pattern according to the output condition using information (e.g., time information or location information) detected through a communication circuit or a sensor (e.g. a location communication module).

Figure 4B:
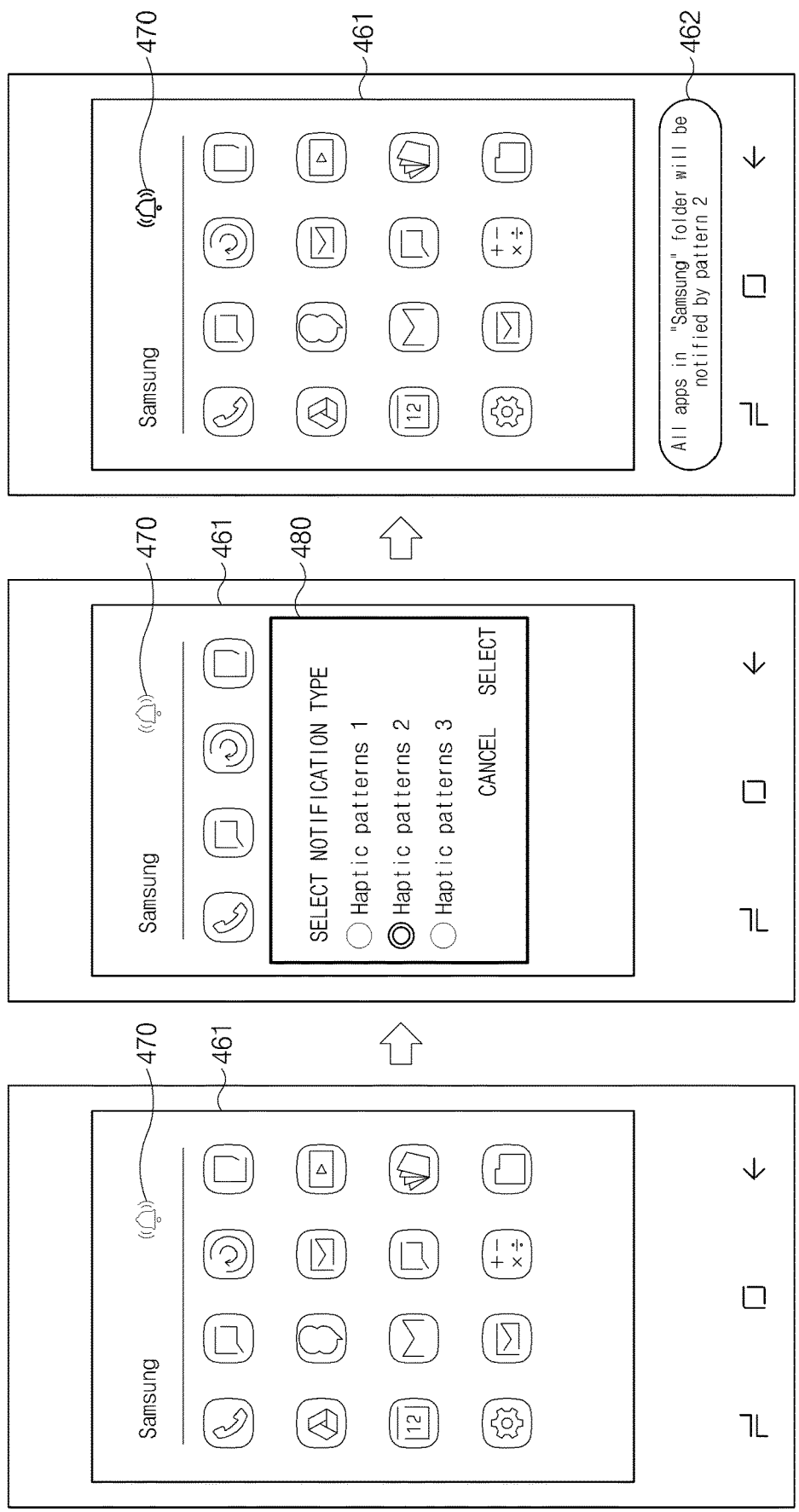
FIG. 4B illustrates screens on which a haptic pattern list in a pop-up window is displayed, according to an embodiment.

FIG. 4B illustrates screens on which a haptic pattern list in a pop-up window is displayed, according to an embodiment.

Referring to FIG. 4B, when a folder icon is selected, the processor 160 may display a first user interface 461 that displays the execution icons of the plurality of applications included in the folder. The first user interface 461 may include a notification setting object 470 for collectively setting notifications.

In response to a specified user input (e.g., a long touch input, a 3D touch input, a double tap input, a slide input, or the like) to the notification setting object 470, the processor 160 may display a haptic pattern list 480. The haptic pattern list 480 may be output in a pop-up window on top of the existing first user interface 461. Thus, the haptic pattern list 480 may overlap the first user interface 461.

The haptic pattern list 480 may include various types of haptic patterns applicable to the folder. For example, the haptic pattern list 480 may be created by combining the various haptic patterns that can be used for the applications included in the folder.

When a user selects one haptic pattern from the haptic pattern list 480, the processor 160 may output notifications for the applications included in the folder by using the selected haptic pattern. The processor 160 may inform the user of the changed information through a pop-up 462. Furthermore, the processor 160 may modify the image of the notification setting object 470 (e.g., from white to orange) to indicate the change of the haptic pattern settings.

Figure 5:
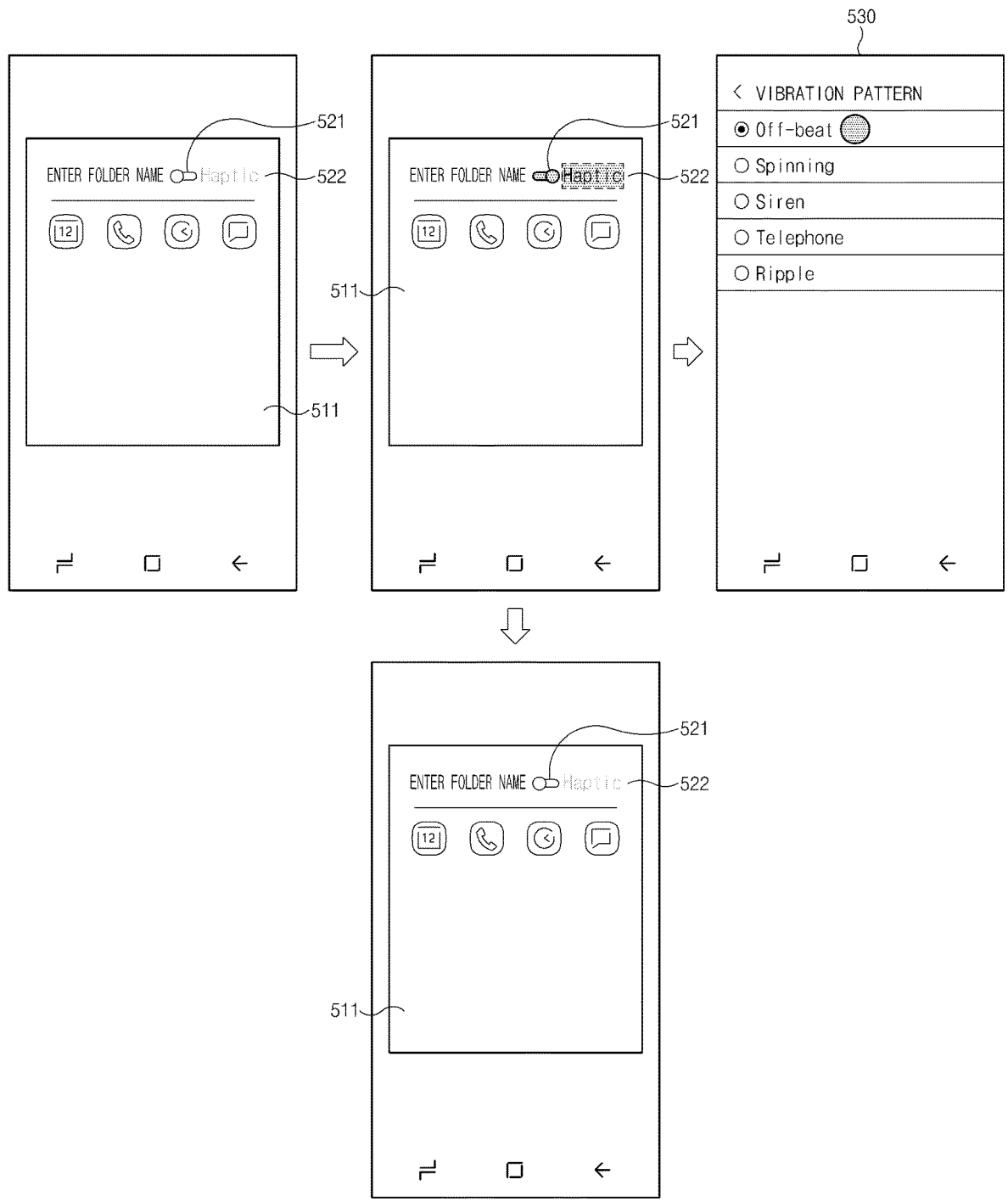
FIG. 5 illustrates screens including a plurality of notification setting objects according to an embodiment.

FIG. 5 illustrates screens including a plurality of notification setting objects according to an embodiment. FIG. 5 is merely illustrative, and the present disclosure is not limited thereto.

Referring to FIG. 5, when a folder icon is selected, the processor 160 may display a first user interface 511 that displays the execution icons of the plurality of applications included in the folder.

The first user interface 511 may include first and second notification setting objects 521 and 522 for collectively setting notifications for the applications included in the folder.

For example, the first notification setting object 521 may be a slide button for turning on/off the notifications for the plurality of applications. The second notification setting object 522 may be a button for displaying a haptic pattern list 530.

After the first user interface 511 is displayed and there is no additional separate user input, the first notification setting object 521 may default to be off. When the first notification setting object 521 is in the off state, the second notification setting object 522 may be deactivated. In this case, no collective notification setting is applied to the plurality of applications, and the processor 160 may determine whether and how to output haptic notifications for the applications based on the individual settings for the respective applications.

In response to a user's touch input to the first notification setting object 521, the processor 160 may change the first notification setting object 521 to the on state. When the first notification setting object 521 is in the on state, the processor 160 may change the second notification setting object 522 into being activated.

In response to a specified user input to the second notification setting object 522, the processor 160 may display the haptic pattern list 530. The haptic pattern list 530 may include various types of haptic patterns applicable to the folder. When the user selects one haptic pattern from the haptic pattern list 530, the notifications for the applications included in the folder may be output by using the selected haptic pattern.

Further, in response to a touch input of the user to the first notification setting object 521 in the on state, the processor 160 may change the first notification setting object 521 back to the off state and the second notification setting object 522 may be deactivated again. In this case, the processor 160 may determine whether and how to output haptic notifications for the applications based on the individual settings for the respective applications.

Figure 6:
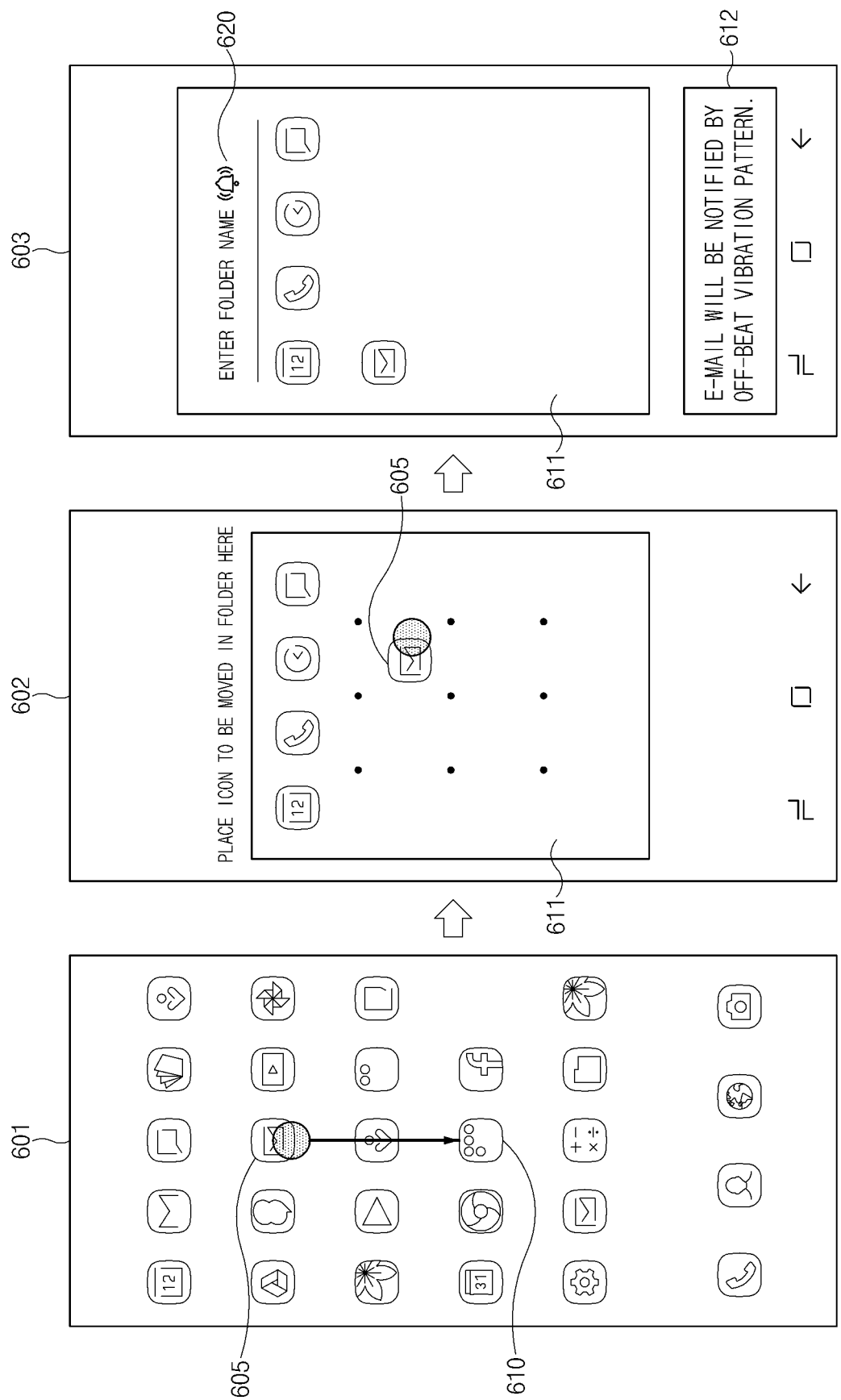
FIG. 6 illustrates screens on which an execution icon of an application is added to a folder, according to an embodiment.

FIG. 6 illustrates screens on which an execution icon of an application is added to a folder, according to an embodiment.

Referring to FIG. 6, the processor 160 may display a folder icon 610 on a screen 601 of the display 110. For example, the processor 160 may arrange the folder icon 610 and execution icons of various applications at specified intervals on the home screen.

On the screen 601, an application may be added to the folder corresponding to the folder icon 610 by a user input. For example, the user input may be a touch input to touch and move an execution icon 605 of the application such that the execution icon 605 is moved to overlap the folder icon 610.

In response to the user input, the processor 160 may display, on a screen 602, a first user interface 611 that includes the execution icons of the plurality of applications included in the folder and the newly-added execution icon 605.

When the process of adding the application is completed, the processor 160 may display, on a screen 603, a notification setting object 620 (e.g., a touch button) for collectively controlling notifications for the plurality of applications included in the folder.

According to an embodiment, in the case where the folder is set to output notification according to a common haptic pattern, the added application may be set to output notification according to the haptic pattern set for the folder.

For example, in the case where the common haptic pattern for the folder is set to the off-beat haptic pattern, the newly-added e-mail application may be set to output notifications according to the off-beat haptic pattern. In this case, the processor 160 may inform the user of the haptic pattern change through a pop-up 612.

According to an embodiment, when the application is added to the folder, the haptic pattern set for the added application may be set as the common haptic pattern for the folder. For example, when the added e-mail application is currently set to the ripple haptic pattern, the processor 160 may set haptic patterns for all applications included in the folder to the ripple haptic pattern.

According to an embodiment, in the case where a folder icon is created by user input, a common haptic pattern may not be set for the folder corresponding to the folder icon absent additional user input. Alternatively, a default haptic pattern may be applied to the applications in the folder.

For example, in the case where an execution icon of a first application is moved by a user input to overlap an execution icon of a second application, the processor 160 may create a folder icon that includes the execution icon of the first application and the execution icon of the second application. The processor 160 may then set haptic notifications for the first and second applications to a default (e.g., off-beat) pattern.

Figure 7:
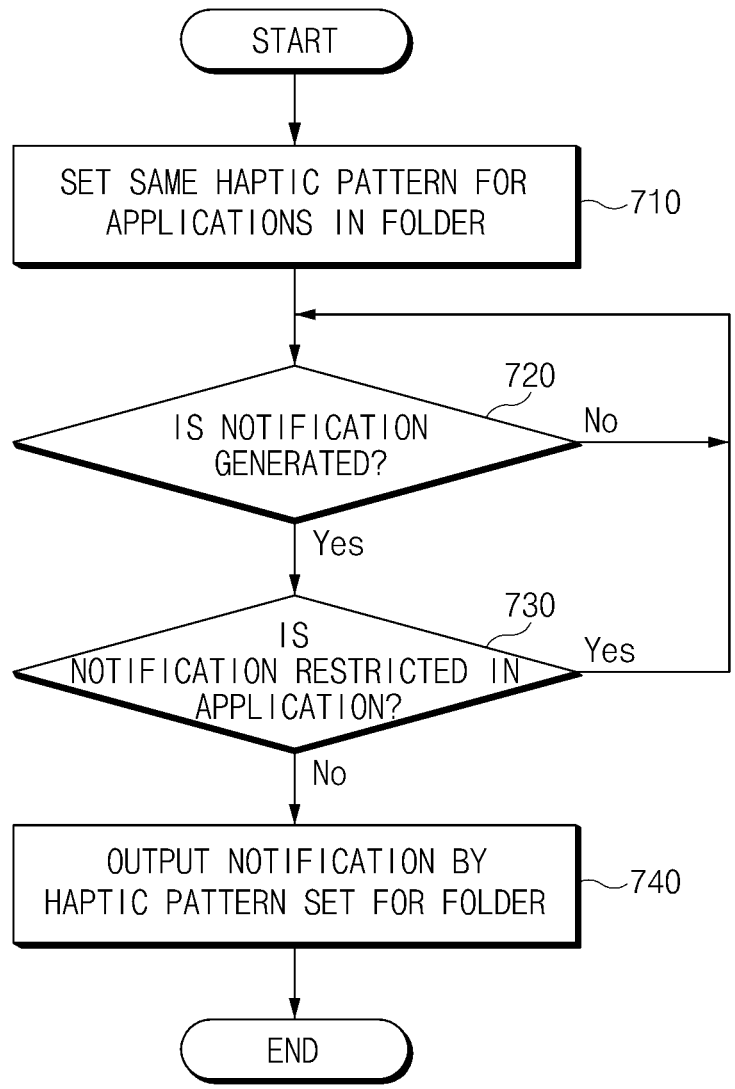
FIG. 7 is a flowchart illustrating a method of outputting notifications for applications, according to an embodiment.

FIG. 7 is a flowchart illustrating a method of outputting notifications for applications, according to an embodiment.

Referring to FIG. 7, in operation 710, the processor 160 may set the same haptic pattern for a plurality of applications in a folder.

For example, in the case where a user selects the manner pattern from a haptic pattern list, the processor 160 may set notifications for the plurality of applications in the folder to the manner pattern.

In operation 720, the processor 160 may determine whether notification is generated by at least one of the plurality of applications in the folder. For example, in the case where an e-mail application is included in the plurality of applications, the processor 160 may determine whether an event requiring notification such as e-mail reception has occurred.

When it is determined that notification is generated by at least one of the plurality of applications, the processor 160 may, in operation 730, determine whether the notification is restricted in the application that generated the notification.

When it is determined that the notification is restricted in the application, the processor 160 may not output a notification for the event. For example, in the case where e-mail reception notification is blocked in the e-mail application, the processor 160 may not output the e-mail reception notification, irrespective of the haptic setting for the folder.

According to an embodiment, when it is determined that the notification is restricted in the application, the processor 160 may output a notification for the event. For example, in the case where e-mail reception notification is blocked in the e-mail application, the processor 160 may output the e-mail reception notification, irrespective of the haptic setting for the e-mail application.

When it is determined that the notification is possible in the application, the processor 160 may, in operation 740, output the notification by using the haptic pattern set for the folder. In the above example, the e-mail reception notification may be output by using the manner pattern.

According to an embodiment, the processor 160 may output notification by using the haptic pattern set for the folder, irrespective of individual notification output settings of the various applications included in the folder. For example, in the case where a specified haptic pattern (e.g., manner pattern) is set for a folder that includes an e-mail application, when e-mail is received, a haptic notification of the specified haptic pattern (e.g., manner pattern) may be output.

A notification output method according to certain embodiments, which is performed in an electronic device, may include displaying, on a display, a folder icon that includes execution icons of a plurality of applications, and in response to a first user input selecting the folder icon, displaying a user interface for collectively controlling notifications for the plurality of applications.

According to certain embodiments, the user interface may include the execution icons of the plurality of applications and at least one object for setting an output type for the notifications.

According to certain embodiments, the method may further include, in response to a second user input to the at least one object, turning the notifications for the plurality of applications on or off, or outputting a list of the output types of the notifications.

According to certain embodiments, the notification output method may further include, when a notification is generated by at least one of the plurality of applications, outputting the notification by using a notification pattern selected through the user interface.

Figure 8:
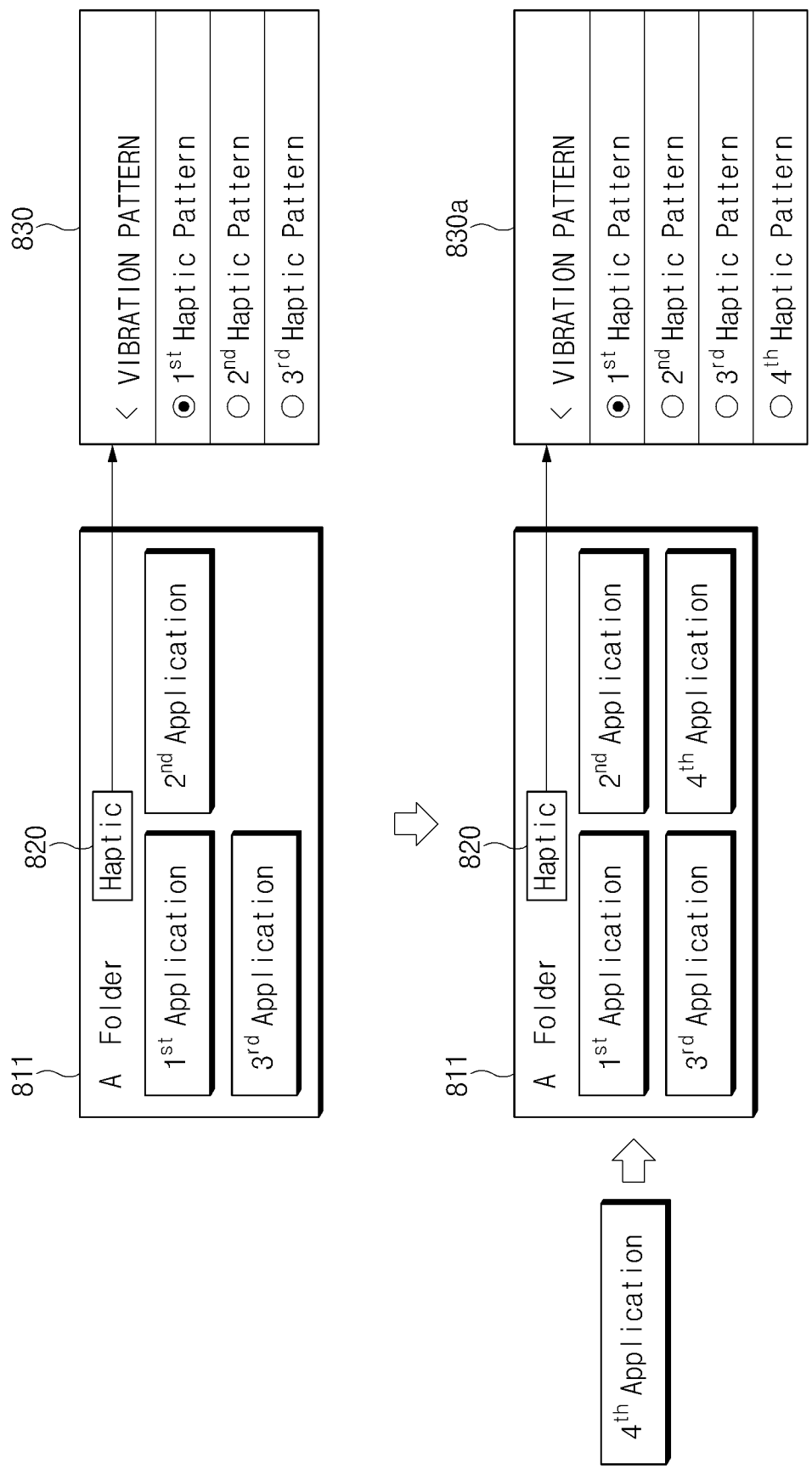
FIG. 8 is a view illustrating a dynamic change of a haptic pattern list according to an embodiment.

FIG. 8 is a view illustrating a dynamic change of a haptic pattern list according to an embodiment. FIG. 8 is merely illustrative, and the present disclosure is not limited thereto.

Referring to FIG. 8, when a folder icon on a screen is selected, the processor 160 may display a first user interface 811 that displays the execution icons of the plurality of applications included in the folder. The first user interface 811 may include a notification setting object 820 for collectively setting notifications for the plurality of applications.

In response to a specified user input to the notification setting object 820, the processor 160 may display a haptic pattern list 830. The haptic pattern list 830 may include various types of haptic patterns applicable to the folder.

According to an embodiment, the processor 160 may configure the haptic pattern list 830, which is applied to the folder, based on the haptic patterns that applicable to the applications included in the folder.

For example, in the case where first to third haptic patterns can be set in first to third applications, respectively, the processor 160 may include the first to third haptic patterns in the haptic pattern list 830.

In the case where a fourth application in which a fourth haptic pattern can be set is added by a user input, the processor 160 may add the fourth haptic pattern to the haptic pattern list 830.

According to an embodiment, the processor 160 may configure the haptic pattern list 830 applied to the folder. The processor 160 may do so by combining or mixing the haptic patterns that can be set in the applications included in the folder. For example, in the case where the first and second haptic patterns can be set in the first and second applications, respectively, the processor 160 may add a new haptic pattern to the haptic pattern list 830, where the new haptic pattern is obtained by mixing the first haptic pattern and the second haptic pattern.

Figure 9:
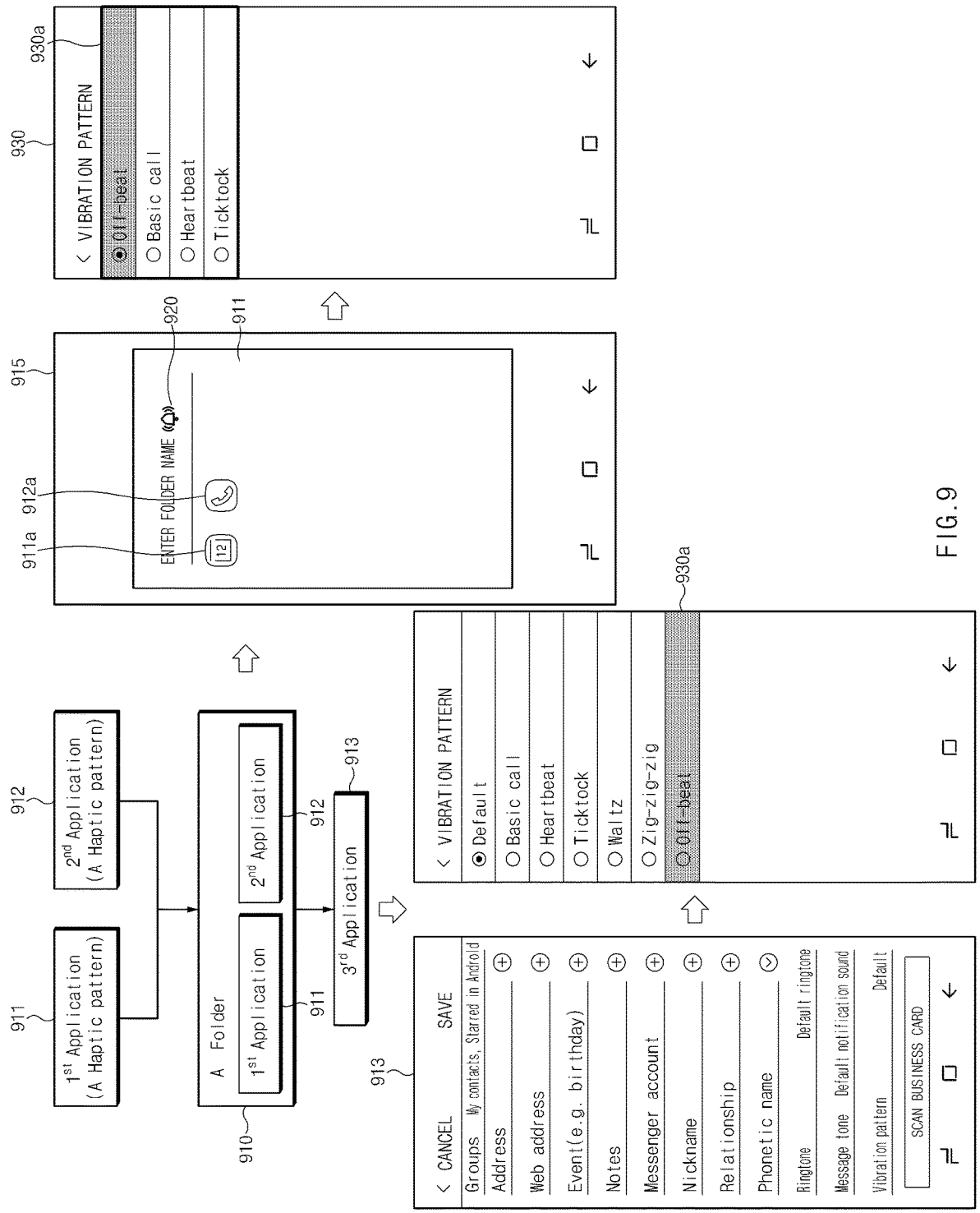
FIG. 9 illustrates screens on which a haptic pattern is applied to a folder according to an embodiment.

FIG. 9 illustrates screens on which a haptic pattern is applied to a folder according to an embodiment. FIG. 9 is merely illustrative, and the present disclosure is not limited thereto.

Referring to FIG. 9, the processor 160 may create a folder 910 in which a plurality of applications are included. In response to a user input, the processor 160 may output notifications for the plurality of applications by using a haptic pattern applied to the folder 910.

For example, in the case where an execution icon 911a of a first application 911 is moved by a user input to overlap an execution icon 912a of a second application 912, the processor 160 may create a folder icon that includes the execution icon 911a of the first application 911 and the execution icon 912a of the second application 912. When the folder icon is selected by a user input, the processor 160 may display a first user interface 915 that includes the execution icon 911a of the first application 911 and the execution icon 912a of the second application 912.

The first user interface 915 may include a notification setting object 920 for collectively setting notifications for the first and second applications 911 and 912 included in the folder 910. In response to a specified user input to the notification setting object 920, the processor 160 may display a haptic pattern list 930.

The haptic pattern list 930 may include various types of haptic patterns applicable to the folder 910. For example, the haptic pattern list 930 may be created by combining haptic patterns that can be used in the first and second applications 911 and 912 included in the folder 910.

According to an embodiment, the haptic pattern list 930 may include a haptic pattern 930a stored in a memory. The haptic pattern 930a may further be applied to another application (e.g., a third application 913) that is not in the folder.

For example, in the case where the first application 911 (e.g., a clock app) and the second application 912 (e.g., a calendar app) are included in the folder 910, the processor 160 may output notifications for the first and second applications 911 and 912 according to the haptic pattern (e.g., an off-beat pattern) set for the folder 910. The processor 160 may further enable the haptic pattern (e.g., an off-beat pattern) set for the folder 910 to be used for the third application 913 (e.g., an address app). Accordingly, when storing a new contact number in the third application 913 (e.g., an address app), the off-beat haptic pattern may be output.

Figure 10:
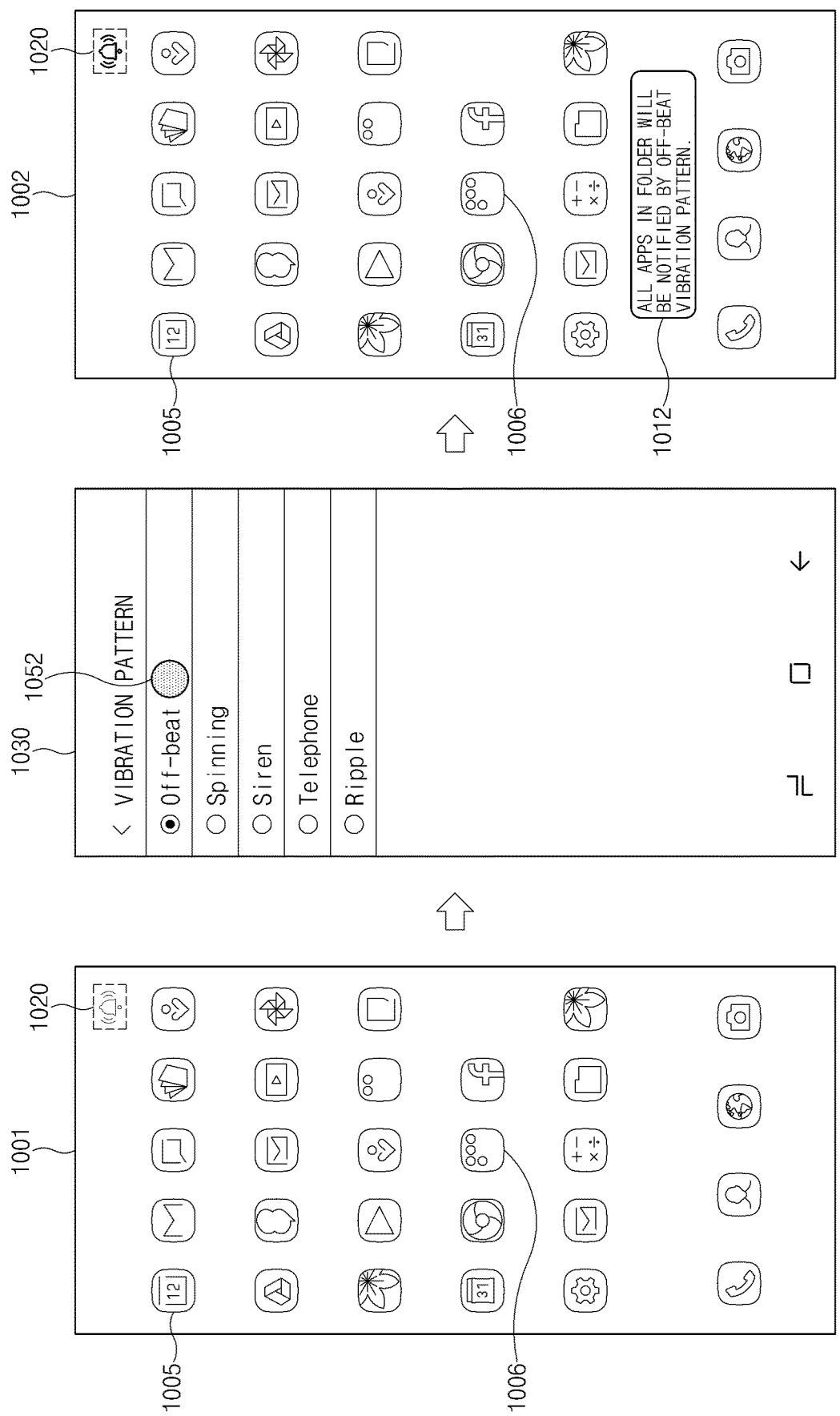
FIG. 10 illustrates screens on which a haptic pattern is applied in a screen according to an embodiment.

FIG. 10 illustrates screens on which a haptic pattern is applied in a screen according to an embodiment.

Referring to FIG. 10, the processor 160 may display various types of icons on a screen 1001. The icons may include an icon 1005 for executing an application and a folder icon 1006. For example, the screen 1001 may be the home screen.

According to an embodiment, the processor 160 may include a notification setting object 1020 for collectively controlling notifications for applications associated with the screen 1001 (e.g., applications corresponding to execution icons and applications included in the folder icon in screen 1001).

In response to a specified user input (e.g., a long touch input, a 3D touch input, a double tap input, a slide input, or the like) to the notification setting object 1020, the processor 160 may display a haptic pattern list 1030.

The haptic pattern list 1030 may include various types of haptic patterns applicable to the applications associated with the screen 1001.

In response to a user input 1052 to one haptic pattern in the haptic pattern list 1030, the processor 160 may output notifications for the applications associated with the screen 1001 (e.g., the applications corresponding to the execution icons and the applications included in the folder icon) by using the haptic pattern selected by the user input 1052.

For example, in the case where a user selects the off-beat haptic pattern from the haptic pattern list 1030, notification patterns for the applications associated with the screen 1001 may be set to the off-beat haptic pattern. Thus, in the case where at least one of the applications associated with the screen 1001 generates notification, the processor 160 may output off-beat notification.

Figure 11:
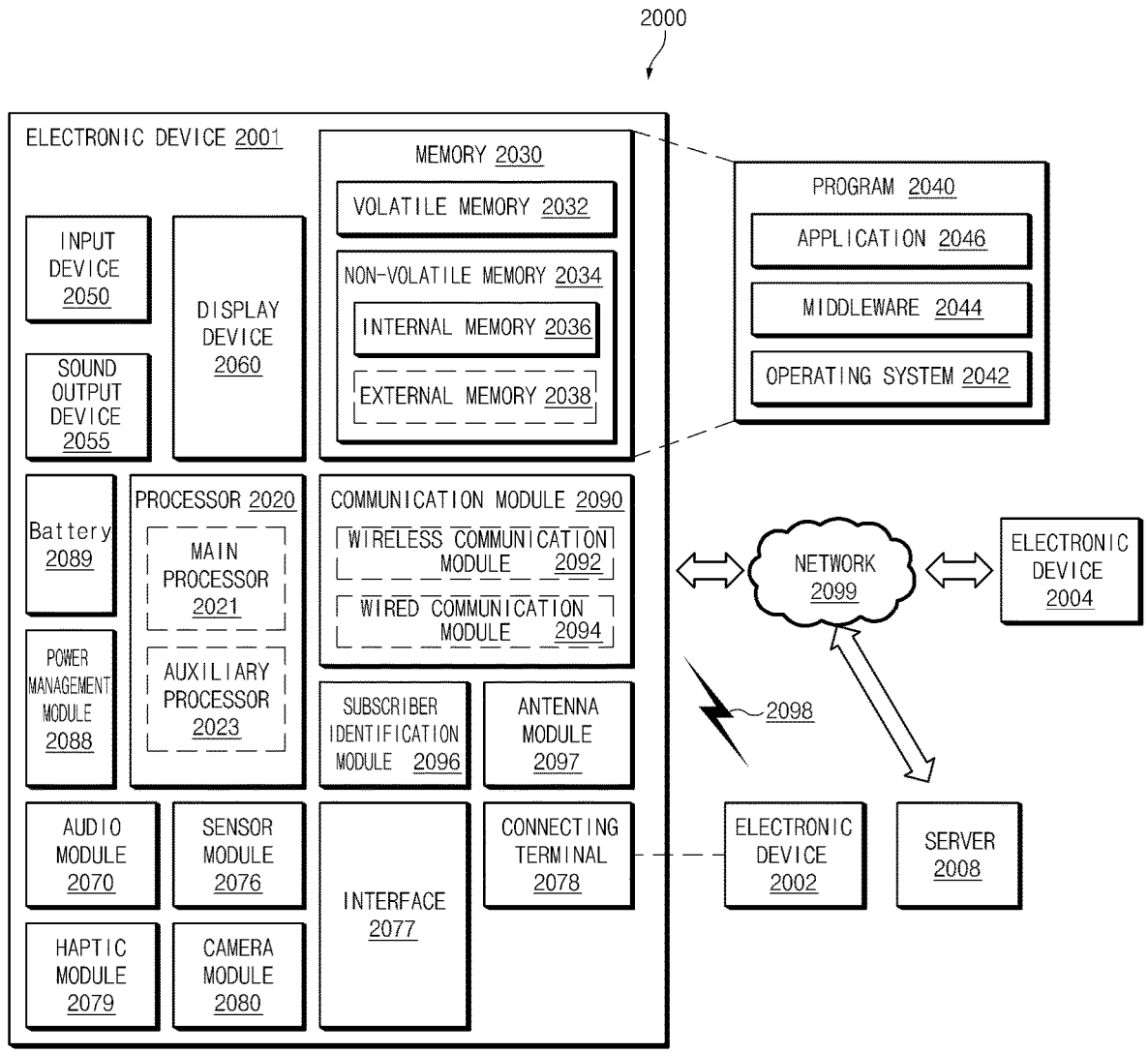
FIG. 11 illustrates a block diagram of an electronic device in a network environment according to various embodiments.

FIG. 11 is a block diagram of an electronic device 2001 in a network environment 2000, according to various embodiments.

Referring to FIG. 11, the electronic device 2001 in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and a coprocessor 2023 (e.g., a graphic processing device, an image signal processor, a sensor hub processor, or a communication processor), which may be operated independently of or together with the main processor 2021. Additionally or alternatively, the coprocessor 2023 may be configured to use lower power than the main processor 2021 or to be specialized for a specified function. The coprocessor 2023 may be implemented separately from the main processor 2021 or may be implemented as a part of the main processor 2021.

The coprocessor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the coprocessor 2023 (e.g., an image signal processor or a communication processor) may be implemented as a part of any other component (e.g., the camera module 2080 or the communication module 2090) which is functionally (or operatively) associated with the coprocessor 2023.

The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034. The nonvolatile memory 2034 may include an internal memory 2036 and an external memory 2038.

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connection terminal 2078 may include a connector that may allow the electronic device 2001 to be physically connected with an external electronic device (e.g., the electronic device 2002). According to an embodiment, the connection terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement. According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a global navigation satellite system (GNSS) communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 2092 may verify and authenticate the electronic device 2001 within a communication network, such as the first network 2098 or the second network 2099, by using subscriber information (e.g., international mobile subscriber identity (IMSI)) stored in the subscriber identification module 2096.

The antenna module 2097 may transmit a signal or a power to the outside (e.g., an external electronic device) or may receive a signal or a power from the outside. According to an embodiment, the antenna module 2097 may include one or more antennas, and at least one antenna which is suitable for a communication scheme used in a computer network such as the first network 2098 or the second network 2099 may be selected, for example, by the communication module 2090 from the one or more antennas. The signal or power may be exchanged between the communication module 2090 and an external electronic device through the selected at least one antenna or may be received from the external electronic device through the selected at least one antenna and the communication module 2090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2001 and the external electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the external electronic devices 2002, 2004, or server 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

According to certain embodiments, an electronic device includes a display, a memory, and a processor, wherein the processor is configured to display, on the display, a folder icon that includes execution icons of a plurality of applications, and in response to a first user input selecting the folder icon, display a user interface for collectively controlling notifications for the plurality of applications.

According to certain embodiments, the user interface includes the execution icons of the plurality of applications and at least one object for setting output types of the notifications.

According to certain embodiments, the processor is further configured to, in response to a second user input to the at least one object, turn the notifications for the plurality of applications on or off, or output a list of the output types of the notifications.

According to certain embodiments, the processor is further configured to modify an image of the at least one object, in response to the second user input.

According to certain embodiments, the at least one object includes a first object for collectively turning the notifications for the plurality of applications on or off and a second object for displaying the list on the display.

According to certain embodiments, the processor is further configured to display the list in the form of a pop-up window that overlaps the user interface.

According to certain embodiments, the list includes an item corresponding to a notification pattern obtained by combining or mixing notification patterns applicable to at least two applications in the plurality of applications.

According to certain embodiments, when a notification pattern to be collectively applied to the plurality of applications is set through the user interface, the processor is further configured to display information related to the notification pattern through a pop-up window. The notification pattern includes at least one of a haptic pattern, a notification sound pattern, and an LED color pattern. The processor is further configured to enable the notification pattern as a notification pattern in another application installed in the electronic device.

According to certain embodiments, when an application is added to a folder corresponding to the folder icon, the processor is further configured to set a notification pattern for the plurality of applications included in the folder, based on a notification pattern of the added application.

According to certain embodiments, when a notification is generated by at least one of the plurality of applications, the processor is further configured to output haptic feedback corresponding to the generated notification by using a notification pattern selected through the user interface. The processor is further configured to determine whether to output the haptic feedback, based on whether the notifications for the plurality of applications are blocked or not. The processor is further configured to prevent output of the haptic feedback when the at least one of the plurality of applications restricts output of notifications. The processor is further configured to output the haptic feedback according to the selected notification pattern when the at least one of the plurality of applications does not restrict output of notifications.

According to certain embodiments, an electronic device includes a display, a memory and a processor, wherein the processor is configured to create a group for a plurality of applications installed in the electronic device, display a user interface for collectively controlling notifications for the plurality of applications included in the group, and in response to a user input to the user interface, set a notification pattern to be collectively applied to the plurality of applications.

According to certain embodiments, the plurality of applications are two or more applications included in a folder.

According to certain embodiments, the plurality of applications are applications associated with execution icons displayed on the display.

According to certain embodiments, a notification output method is executed by an electronic device. The method includes displaying, on a display, a folder icon that includes execution icons of a plurality of applications, and in response to a first user input selecting the folder icon, displaying a user interface for collectively controlling notifications for the plurality of applications.

According to certain embodiments, the user interface includes the execution icons of the plurality of applications and at least one object for setting an output type for the notifications.

According to certain embodiments, the method further includes, in response to a second user input to the at least one object, turning the notifications for the plurality of applications on or off, or outputting a list of the output types of the notifications.

According to certain embodiments, the method further includes when notification is generated by at least one of the plurality of applications, outputting the at least one notification by using a notification pattern selected through the user interface.

While the present disclosure has been shown and described with reference to various embodiments thereof, it will be understood by those skilled in the art that various changes in form and details may be made therein without departing from the scope of the present disclosure as defined by the appended claims and their equivalents.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
a display;
a memory; and
a processor,
wherein the processor is configured to:
display, on the display, a folder icon that includes execution icons of a plurality of applications;
in response to a first user input selecting the folder icon, display a user interface for collectively controlling notifications for the plurality of applications; and
when an application is added to a folder corresponding to the folder icon, collectively set a first notification pattern for the plurality of applications included in the folder, based on a second notification pattern of the added application.

2. The electronic device of claim 1, wherein the user interface includes the execution icons of the plurality of applications and at least one object for setting output types of the notifications.

3. The electronic device of claim 2, wherein the processor is further configured to:

in response to a second user input to the at least one object, turn the notifications for the plurality of applications on or off, or output a list of the output types of the notifications.

4. The electronic device of claim 3, wherein the processor is further configured to modify an image of the at least one object, in response to the second user input.

5. The electronic device of claim 3, wherein the at least one object includes a first object for collectively turning the notifications for the plurality of applications on or off and a second object for displaying the list on the display.

6. The electronic device of claim 3, wherein the processor is further configured to display the list as a pop-up window that overlaps the user interface.

7. The electronic device of claim 3, wherein the list includes an item corresponding to a third notification pattern obtained by combining or mixing notification patterns applicable to at least two applications in the plurality of applications.

8. The electronic device of claim 1, wherein, when a fourth notification pattern to be collectively applied to the plurality of applications is set through the user interface, the processor is further configured to display information related to the fourth notification pattern through a pop-up window.

9. The electronic device of claim 8, wherein the fourth notification pattern includes at least one of a haptic pattern, a notification sound pattern, and a light emitting diode (LED) color pattern.

10. The electronic device of claim 8, wherein the processor is further configured to set the fourth notification pattern as a fifth notification pattern in another application installed in the electronic device, wherein the other application is not included in the folder.

11. The electronic device of claim 1, wherein, when a notification is generated by at least one of the plurality of applications, the processor is further configured to output haptic feedback corresponding to the generated notification by using a sixth notification pattern selected through the user interface.

12. The electronic device of claim 11, wherein the processor is further configured to determine whether to output the haptic feedback, based on whether the notifications for the plurality of applications are blocked or not.

13. The electronic device of claim 12, wherein the processor is further configured to prevent output of the haptic feedback when the at least one of the plurality of applications restricts output of notifications.

14. The electronic device of claim 12, wherein the processor is further configured to output the haptic feedback according to the sixth notification pattern when the at least one of the plurality of applications does not restrict output of notifications.

15. An electronic device comprising:
a display;
a memory; and
a processor,
wherein the processor is configured to:
create a group for a plurality of applications installed in the electronic device;
display a user interface for collectively controlling notifications for the plurality of applications included in the group;
in response to a user input to the user interface, set a first notification pattern to be collectively applied to the plurality of applications; and
when an application is added to the group, collectively set the first notification pattern to be a second notification pattern of the added application.

16. The electronic device of claim 15, wherein the plurality of applications are two or more applications included in a folder.

17. The electronic device of claim 15, wherein the plurality of applications are applications associated with execution icons displayed on the display.

18. A notification output method executed by an electronic device, the method comprising:
displaying, on a display, a folder icon that includes execution icons of a plurality of applications;
in response to a first user input selecting the folder icon, displaying a user interface for collectively controlling notifications for the plurality of applications; and
when an application is added to a folder corresponding to the folder icon, collectively set a first notification pattern for the plurality of applications included in the folder, based on a second notification pattern of the added application.

19. The method of claim 18, wherein the user interface includes the execution icons of the plurality of applications and at least one object for setting an output type for the notifications.

* * * * *